United States Patent
Wagdy et al.

(10) Patent No.: US 7,591,249 B2
(45) Date of Patent: Sep. 22, 2009

(54) ACTUATION STRUCTURE FOR INTERNAL FUEL CELL METERING VALVE AND ASSOCIATED COMBUSTION TOOL

(75) Inventors: Mohamed K. Wagdy, Arlington Heights, IL (US); Valery H. Vanstaan, Highland Park, IL (US); Eric S. Gibson, Round Lake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 211 days.

(21) Appl. No.: 11/242,311

(22) Filed: Oct. 3, 2005

(65) Prior Publication Data

US 2007/0074706 A1 Apr. 5, 2007

(51) Int. Cl.
   *F02B 71/00* (2006.01)
(52) U.S. Cl. ............. 123/495; 123/46 R; 222/402.15; 227/10
(58) Field of Classification Search ............. 123/46 SC, 123/46 R, 495; 227/10, 9, 130; 222/402.15, 222/402.2, 402.14; 239/337
   See application file for complete search history.

(56) References Cited

U.S. PATENT DOCUMENTS

| | | | |
|---|---|---|---|
| 4,331,277 A | 5/1982 | Green | |
| 4,403,722 A | 9/1983 | Nikolich | |
| 4,483,474 A | 11/1984 | Nikolich | |
| 4,506,808 A | 3/1985 | Goncalves | |
| 4,522,162 A | 6/1985 | Nikolich | |
| 4,838,456 A | 6/1989 | Hamlin | |
| 5,115,944 A * | 5/1992 | Nikolich | 222/94 |
| 5,263,439 A | 11/1993 | Doherty et al. | |
| 5,713,313 A * | 2/1998 | Berry | 123/46 SC |
| 5,918,780 A | 7/1999 | Tanaka | |
| 5,971,245 A | 10/1999 | Robinson | |
| 6,003,740 A * | 12/1999 | Castaneda, Jr. | 222/402.15 |
| 6,102,270 A * | 8/2000 | Robinson | 227/10 |
| 6,179,192 B1 | 1/2001 | Weinger et al. | |
| 6,217,085 B1 * | 4/2001 | Toulouse | 285/319 |
| 6,302,297 B1 | 10/2001 | Richardson et al. | |

(Continued)

FOREIGN PATENT DOCUMENTS

DE  299 19 080 U1  1/2000

(Continued)

OTHER PUBLICATIONS

U.S. Appl. No. 10/959,845, filed Oct. 6, 2004, Panasik et al.

*Primary Examiner*—Stephen K. Cronin
*Assistant Examiner*—Hyder Ali
(74) *Attorney, Agent, or Firm*—Greer, Burns & Crain, Ltd.; Lisa M. Soltis; Mark W. Croll (57) ABSTRACT

In a combustion-powered fastener driving tool employing a fuel cell having an internal fuel metering valve with an axially reciprocating delivery stem, an actuator is provided for causing the dispensing of a desired dose of fuel from the fuel cell prior to each combustion event, the actuator including at least one actuator element configured for exerting an axial force on the stem, releasing the dose of fuel, and a fuel conduit associated with the element and being in fluid communication with the stem for transmitting the fuel for delivery to a combustion engine.

22 Claims, 11 Drawing Sheets

U.S. PATENT DOCUMENTS

| | | | |
|---|---|---|---|
| 6,364,177 B1 * | 4/2002 | Taylor | 222/473 |
| 6,405,906 B1 * | 6/2002 | de Laforcade | 222/321.8 |
| 6,523,722 B1 | 2/2003 | Clark et al. | |
| 6,722,550 B1 * | 4/2004 | Ricordi et al. | 123/46 SC |
| 6,786,378 B2 | 9/2004 | Wagdy et al. | |
| 6,796,478 B2 | 9/2004 | Shkolnikov et al. | |
| 6,938,810 B2 * | 9/2005 | Robinson | 227/10 |
| 6,971,560 B1 * | 12/2005 | Healy et al. | 222/645 |
| 2003/0127488 A1 | 7/2003 | Wagdy et al. | |
| 2005/0035171 A1 | 2/2005 | Ohtsu et al. | |
| 2006/0022013 A1 | 2/2006 | Gaudron | |
| 2006/0225674 A1 | 10/2006 | Ohtsu et al. | |

FOREIGN PATENT DOCUMENTS

| | | |
|---|---|---|
| DE | 198 53 555 | 5/2000 |
| DE | 198 53 556 | 6/2000 |
| DE | 198 53 554 | 7/2000 |

* cited by examiner

ACTUATION STRUCTURE FOR INTERNAL FUEL CELL METERING VALVE AND ASSOCIATED COMBUSTION TOOL

BACKGROUND OF THE INVENTION

This invention relates generally to improvements in fuel cell fuel delivery arrangements for use in combustion tools, and more specifically to actuators for delivering the appropriate amount of fuel for use by a combustion tool during the driving of fasteners, as well as associated combustion tools and their components.

As exemplified in Nikolich U.S. Pat. Nos. 4,403,722, 4,483,474, 4,522,162, and 5,115,944, all of which are incorporated by reference, it is known to use a dispenser such as a fuel cell to dispense a hydrocarbon fuel to a combustion tool, also known as a combustion gas-powered tool, or a combustion gas-powered fastener-driving tool. In particular, a fuel cell of this type is described in Nikolich U.S. Pat. No. 5,115,944, listed above.

A design criterion of such fuel cells is that only a desired amount of fuel should be emitted by the fuel cell for each combustion event. The amount of fuel should be carefully monitored to provide the desired combustion, yet in a fuel-efficient manner to prolong the working life of the fuel cell. Prior attempts to address this dosage factor have resulted in fuel metering valves located in the tool (U.S. Pat. No. 5,263,439) or attached to the fuel cell (U.S. Pat. No. 6,302,297), both of which are also incorporated by reference.

Another design consideration of cell-mounted metering valves is that the fuel metering valve mounted on the fuel cell emits fuel at an approximate right angle to the axis of the fuel cell and the main fuel cell stem valve. To obtain a measured dose of fuel, the tool actuator exerts a force on the fuel metering valve which is transverse to the axis of the cell valve stem. This periodic loading is considered detrimental to the working life and sealing efficiency of the fuel cell stem valve.

Copending, commonly assigned U.S. Ser. No. 10/827,551, incorporated by reference, discloses a fuel metering valve mounted internally within the fuel cell. Such an arrangement addresses the design considerations listed above, as well as others.

However, there is a need for reconfiguring the corresponding combustion tools, both new production and tools existing in the field, to accommodate the new fuel cells and efficiently dispense fuel when needed. There is also a need for providing an actuation system which can withstand repeated combustion cycles in the often rigorous working environment of such combustion tools.

There is a further need for an improved combustion tool fuel cell construction which reduces the number of sealing locations and the periodic loading on the main fuel cell valve stem.

BRIEF SUMMARY OF THE INVENTION

The above-listed needs are met or exceeded by the present actuator for a combustion tool designed for use with a fuel cell having an internal fuel metering valve. The present actuator, available with current production tools and also in a retrofit kit format for tools presently in use, features the capability of axially depressing the fuel stem of the fuel cell in response to conventional pre-firing operational procedures. In one embodiment, the actuator axially depresses the fuel stem in response to depression of the tool's workpiece contact element. In another embodiment, the actuator exerts at least one of an axial and a transverse force on the fuel cell.

More specifically, in a combustion-powered fastener driving tool employing a fuel cell having an internal fuel metering valve with an axially reciprocating delivery stem, an actuator is provided for causing the dispensing of a desired dose of fuel from the fuel cell prior to each combustion event. The actuator includes at least one actuator element configured for exerting an axial force on the stem, releasing the dose of fuel, and a fuel conduit associated with the element and being in fluid communication with the stem for transmitting the fuel for delivery to a combustion engine.

In another embodiment, an actuator assembly is provided for use with a combustion-powered fastener driving tool having a fuel cell compartment with a door and configured for receiving a fuel cell with an internal metering valve and an axially projecting stem so that axial depression of the stem causes the delivery of a measured dose of fuel to the tool for generating a combustion event. The assembly includes an actuator element being pivotally engageable relative to a cylinder head of the tool, a stem receiver engaged on the actuator element and configured for being in fluid communication with the fuel cell stem, and a conduit associated with the actuator element for placing the stem receiver in fluid communication with the cylinder head.

In yet another embodiment, a combustion tool is provided for use with a fuel cell having an internal fuel metering valve emitting a prescribed volume of fuel from a fuel metering chamber through a valve stem. The tool includes a fuel cell chamber configured for receiving the fuel cell, a fuel conduit in fluid communication with the fuel cell chamber, and an actuator in operational relationship to the fuel cell chamber, being directly engaged with the fuel cell stem and configured for actuating the fuel metering valve.

DETAILED DESCRIPTION OF THE INVENTION

Figure 1:
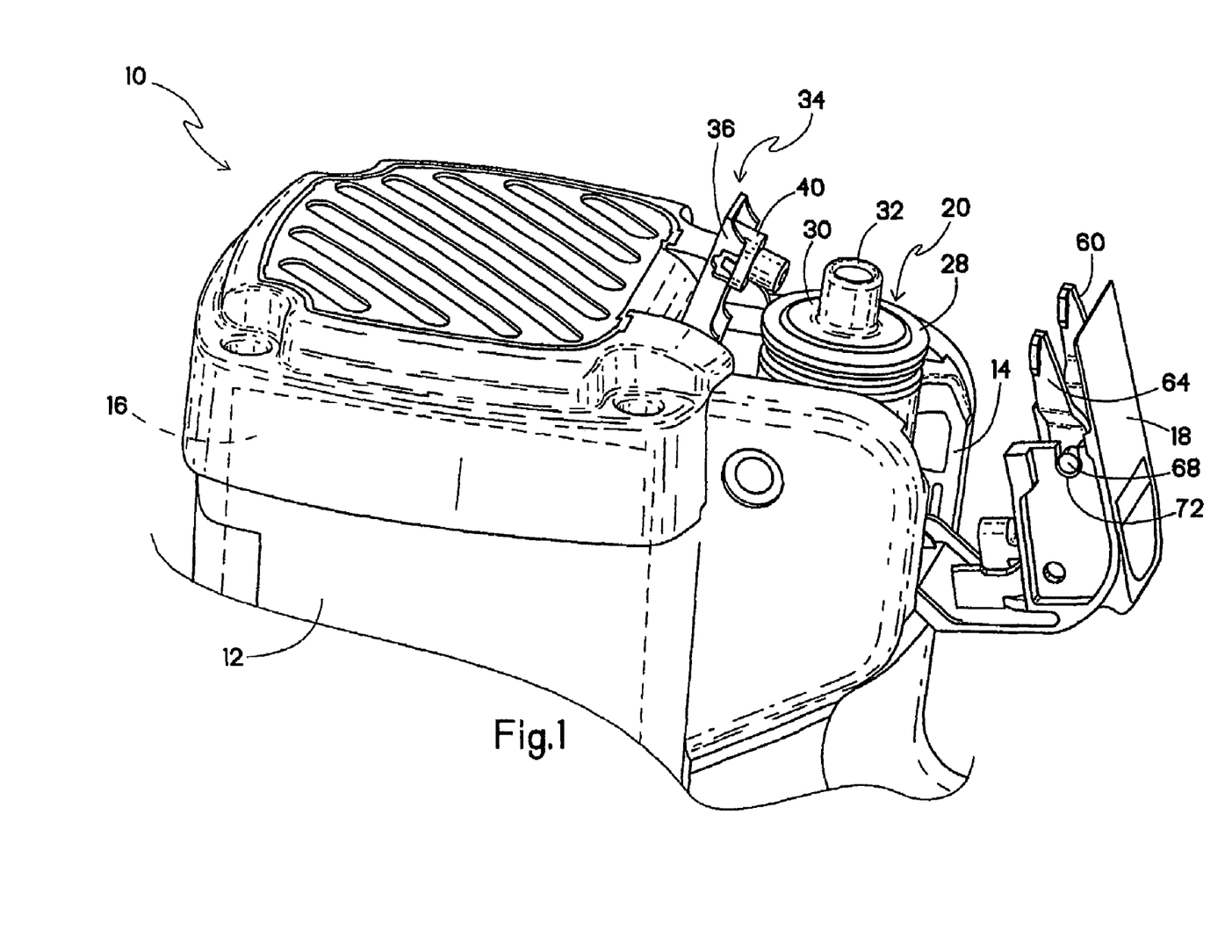
FIG. 1 is a fragmentary top perspective view of a combustion tool equipped with the present actuator and showing a fuel cell in the fuel cell chamber.
Figure 3:
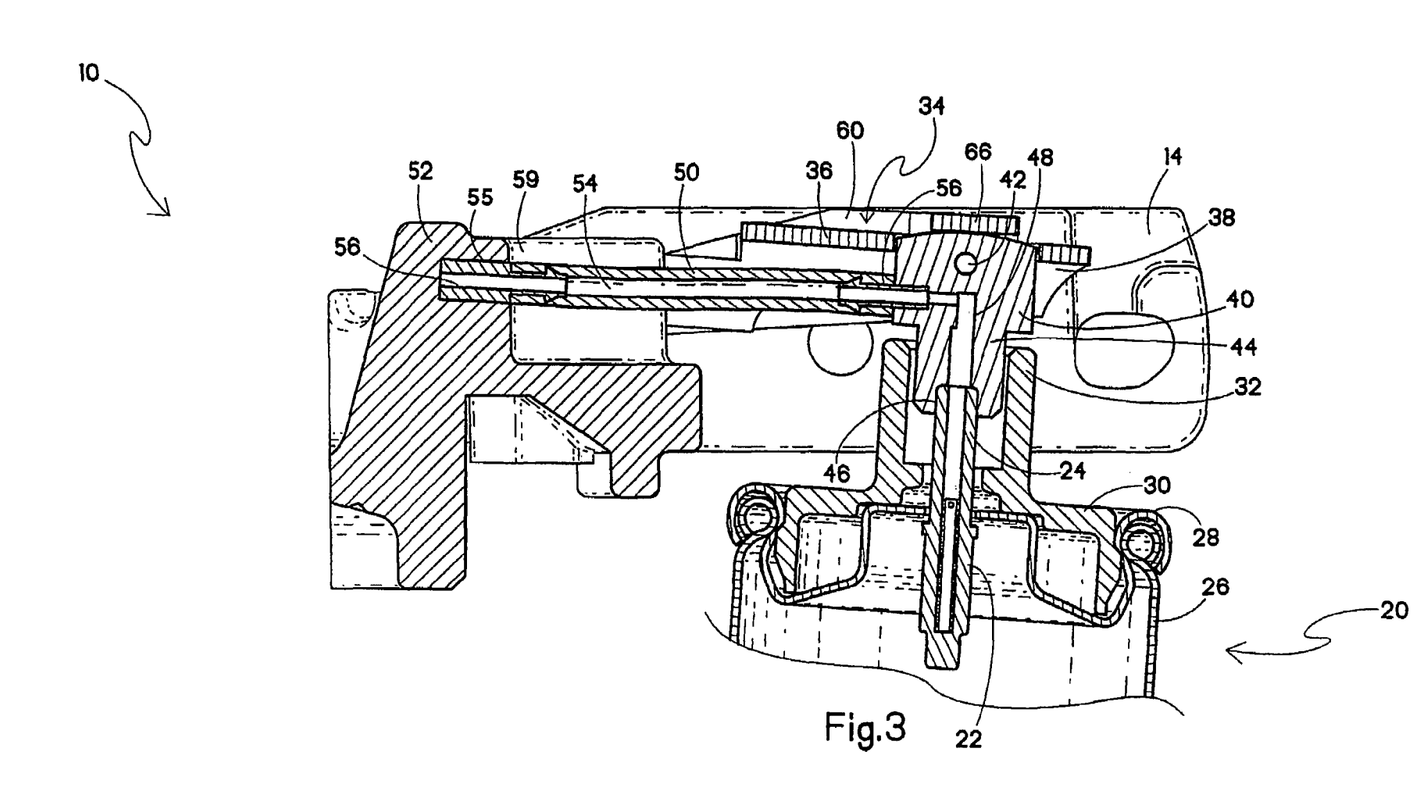
FIG. 3 is a vertical section taken along the line 3-3 of FIG. 2 and in the direction generally indicated.

Referring now to FIGS. 1 and 3, a combustion tool of the type suitable for use with the present actuator is generally designated 10, and refers to the type of combustion powered fastener driving tools described above, as long as they are powered by fuel cells. It is contemplated that the particular construction of the tool may vary to suit the application. Included on the tool 10 is a housing, generally designated 12, defining at an upper end a fuel cell chamber 14 which extends generally vertically, or parallel to a combustion engine 16 (shown hidden). A fuel cell door 18 is pivotally engaged on the housing 12 and is configured to close off the fuel cell chamber 14. The construction and arrangement of such doors is well known in the art.

As described in U.S. Pat. No. 5,263,439, incorporated by reference, inserted into the fuel cell chamber 14 is a fuel cell, generally designated 20, the general construction of which is well known in the art pertaining to combustion tools. The particular construction of the present fuel cell 20, having an internal fuel metering valve 22 (FIG. 3) is described in copending U.S. Ser. No. 10/827,551 which has been incorporated by reference. Generally speaking, a fuel valve stem 24 is biased to a closed position, as by a spring (not shown), but when axially depressed, a measured dose of fuel is dispensed. Upon withdrawal of the axial force, the stem 24 resumes its rest position, and a subsequent dose of fuel flows into the metering chamber (not shown) for the next firing cycle.

Other major components of the fuel cell 20 include an outer shell 26, a closure 28 crimped over an upper end of the shell, and a snap fit stem protector 30. Frictionally engaged in the closure, the stem protector 30 includes a generally cylindrical sleeve 32 surrounding and extending vertically beyond an upper end of the stem 24. The sleeve 30 protects the stem 24 from damage or unwanted actuation to avoid inadvertent dispensing of fuel.

Figure 2:
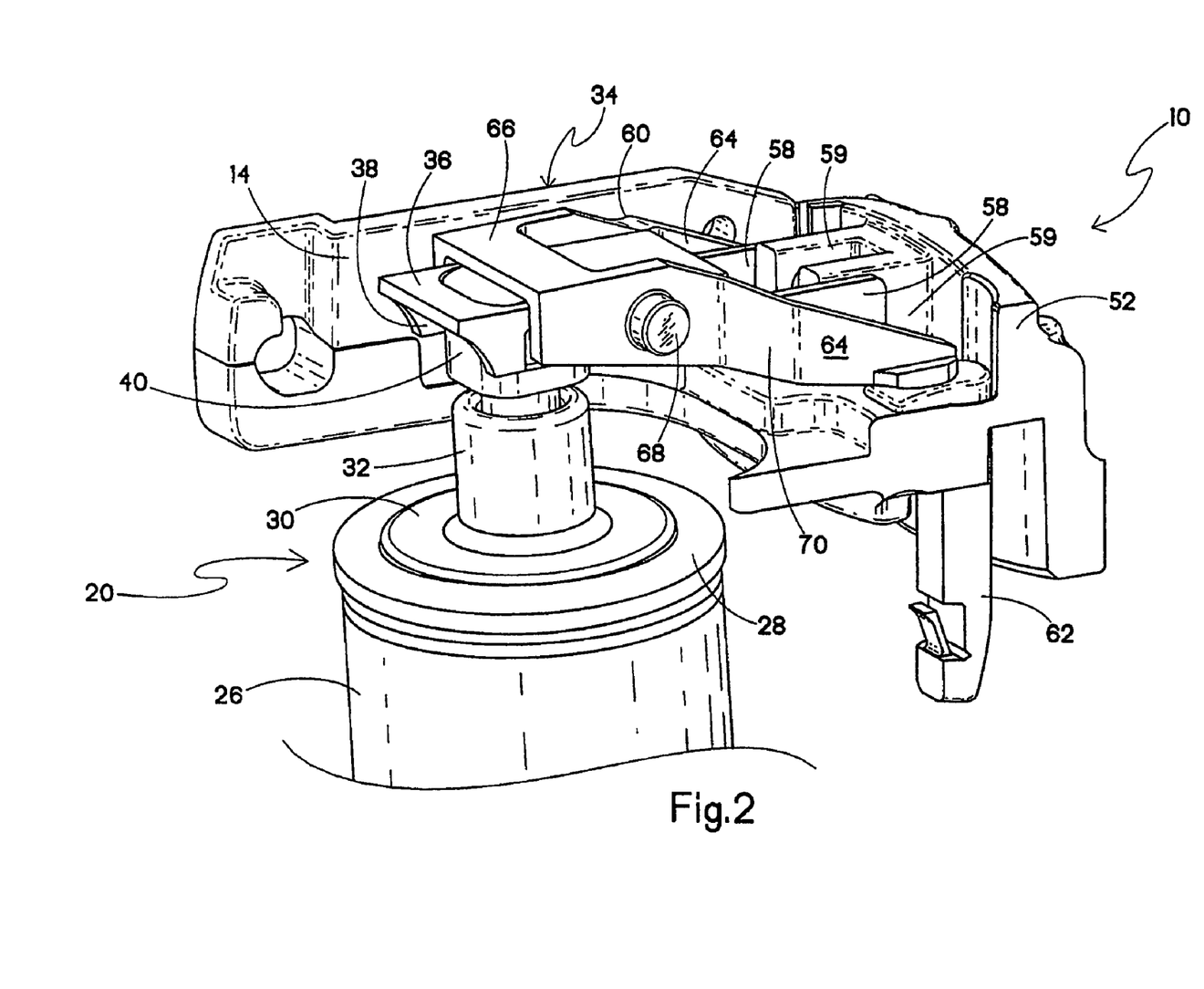
FIG. 2 is a fragmentary top perspective view of the present actuator engaged on a fuel cell in the rest position.
Figure 4:
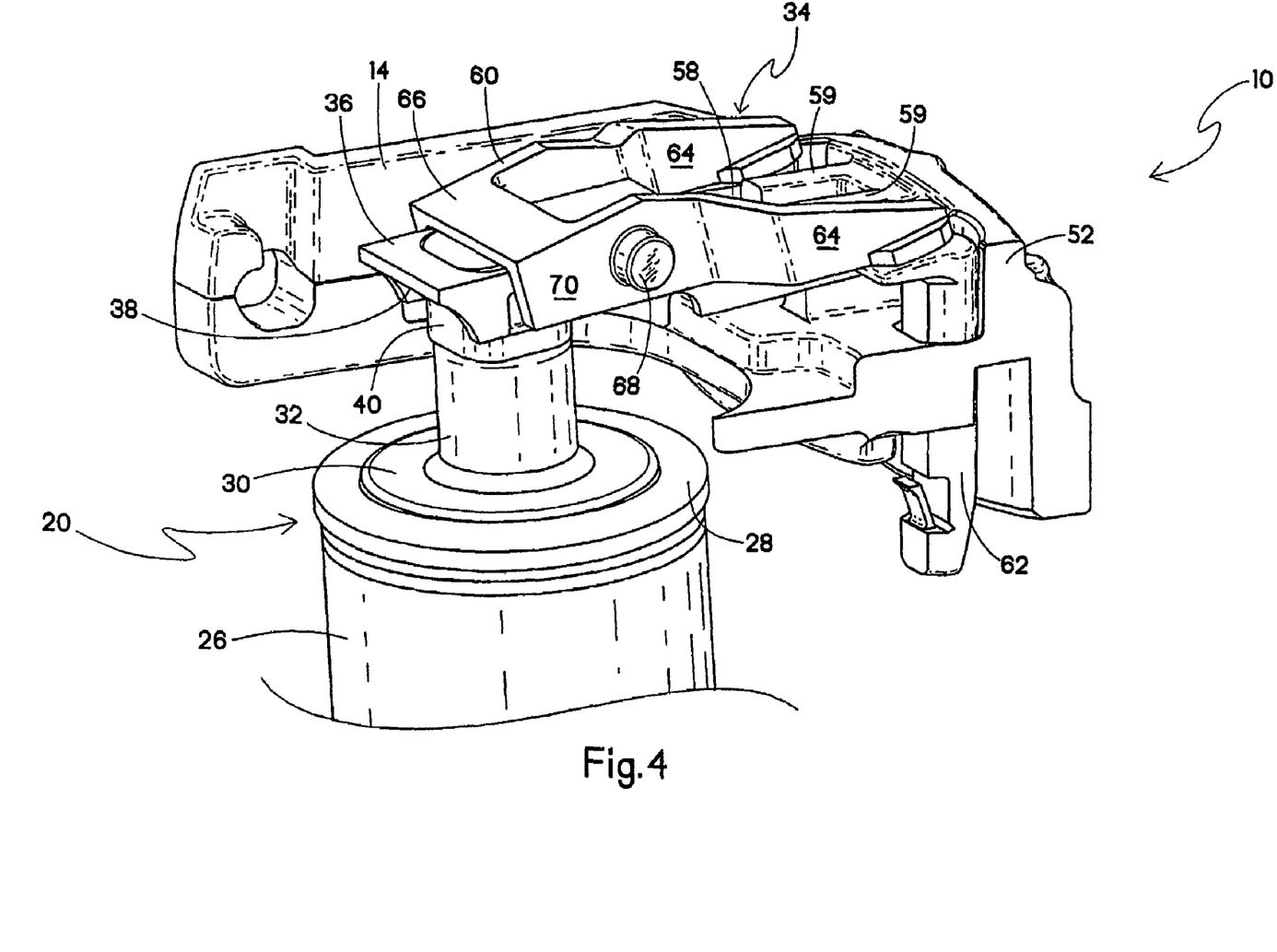
FIG. 4 is a fragmentary top perspective view of the actuator of FIG. 2 shown in the actuated position for dispensing fuel.

Referring now to FIGS. 2-4, a first embodiment of the present actuator is generally designated 34 and is constructed and arranged for exerting an axial force on the fuel cell stem 24. This axial force causes the stem 24 to dispense a measured dose of fuel to the combustion engine 16 prior to each combustion event to initiate combustion. A main component of the actuator 34 is at least one generally elongate actuator element 36 configured for exerting an axial force on the stem 24, releasing the dose of fuel. In the preferred embodiment, the element 36 is in actual contact with the stem 24.

In a generally inverted "U"-shaped channel 38 defined by the actuator element 36 is disposed a generally block-shaped stem receiver 40. The stem receiver 40 is held within the channel 38 by at least one pin 42 passing through a corresponding bore on both the actuator element 36 and the stem receiver. However, other types of fastening arrangements, such as threaded fasteners, chemical adhesives or the like are also contemplated. While the stem receiver 40 is located at an end of the actuator element 36, other locations on the element are contemplated. A depending nozzle 44 on the stem receiver matingly engages the sleeve 32 and defines a socket 46 dimensioned for positively and sealingly engaging the valve stem 24.

An internal passageway 48 in the stem receiver 40 places the fuel cell valve stem 24 in fluid communication with a fuel conduit 50 associated with the actuator element 36, in this case by being located in the channel 38. It will be seen that the passageway 48 generally defines a right angle, so that fuel dispensed by the generally vertically oriented fuel cell 20 and the stem 24 is diverted to a generally horizontal direction. However, the configuration of the passageway 48 may vary to suit the application. The fuel conduit 50 places the fuel cell valve stem 24 in fluid communication with the stem receiver 40 and also with a cylinder head 52 of the tool 10. As is known in the art, the cylinder head 52 is part of the combustion engine 16. Also, the fuel conduit 50 is preferably a segment of flexible tubing 54 and is joined both to an aperture 55 in the cylinder head 52 and to the stem receiver 40 by corresponding barbed fittings 56 at each end for sealingly transmitting the fuel for delivery from the aperture 55 to a combustion chamber (not shown) in the combustion engine 16. It is contemplated that other types of flexible or rigid conduit connection systems may be employed in this situation, depending on the application.

In the preferred embodiment, the actuator element 36 pivotally engages the cylinder head 52 through a pinned connection of at least one and preferably two tabs 58 at an opposite end of the element from the location of the stem receiver 40. The tabs 58 engage ears 59 extending in a spaced, generally parallel orientation from the cylinder head 52. This pivoting connection allows the actuator 34 to be pivoted out of the way to permit a fuel cell exchange is taking place (FIG. 1).

Also included on the actuator 34 is a pivot member 60 provided for transmitting the axial force to the actuator which dispenses the measured dose of fuel from the fuel cell 20. This force originates through the retraction of a workpiece contact element (not shown), depending from a lower end of the tool. As is well known in the art of fastener driving tools, as the tool 10 is pressed against the workpiece prior to driving a fastener, the workpiece contact element retracts relative to the rest of the tool. This retraction is used to mechanically trigger other operations of the tool 10, such as the closing of a combustion chamber by a valve sleeve. In the present application, the movement of the workpiece contact element relative to the tool 10 also is used to initiate the axial force on the fuel cell stem 24 to dispense the fuel.

More specifically, the workpiece contact element is mechanically coupled to at least one and preferably two linkage members, preferably link rods 62 (FIG. 2) which are slidably disposed relative to the cylinder head 52. As the tool 10 is pressed against the workpiece, through an intermediate linkage (not shown) the workpiece contact element causes the link rods 62 to extend vertically. This upward movement causes the rods 62 to engage corresponding arms 64 of the pivot member 60, which is generally "U"-shaped when viewed from above. Corresponding ends of the arms 64 are joined at a bar 66 in operational relationship to the actuator element 36 preferably above the stem receiver 40.

Referring now to FIGS. 2 and 4, a laterally extending lug 68 extends from at least one sidewall 70 of the pivot member 60 and pivotally engages a corresponding socket or opening formation 72 (FIG. 1) in the fuel cell door 18. Thus, the pivot member 60 moves into and out of operation with the actuator element 36 with the movement of the fuel cell door 18. In FIG. 2, the tool 10 is shown in the rest position after the completion of the combustion event and the return of the tool components such as the workpiece contact element and the piston to the pre-firing position. The actuator 34 is biased to this position by the internal spring force applied to the valve stem 24 by a spring (not shown). The link rods 62 are seen in a retracted position.

In FIG. 4, once the tool 10 is pressed against a workpiece and the workpiece contact element is retracted relative to the tool, the link rods 62 extend upwardly, pivoting the pivot member 60 about the lugs 68, causing the bar 66 to axially depress the actuator element 36, which in turn presses the stem receiver downwardly 40 against the stem 24. This downward axial force overcomes the bias of the stem 24 and is stopped by engagement between the stem receiver 40 against the sleeve 32, however, the vertical travel of the stem receiver is sufficient to depress the stem 24 to release and dispense the measured dose of fuel. Thus, the actuator 34 is configured for receiving a force in a first axial direction, and associated with the actuator element 36 for generating an opposite axial force on the stem. At the conclusion of the combustion cycle, when the tool 10 is lifted from the workpiece, the link rods 62 retract and the actuator 34 resumes the rest position of FIG. 2.

Figures 5, 6:
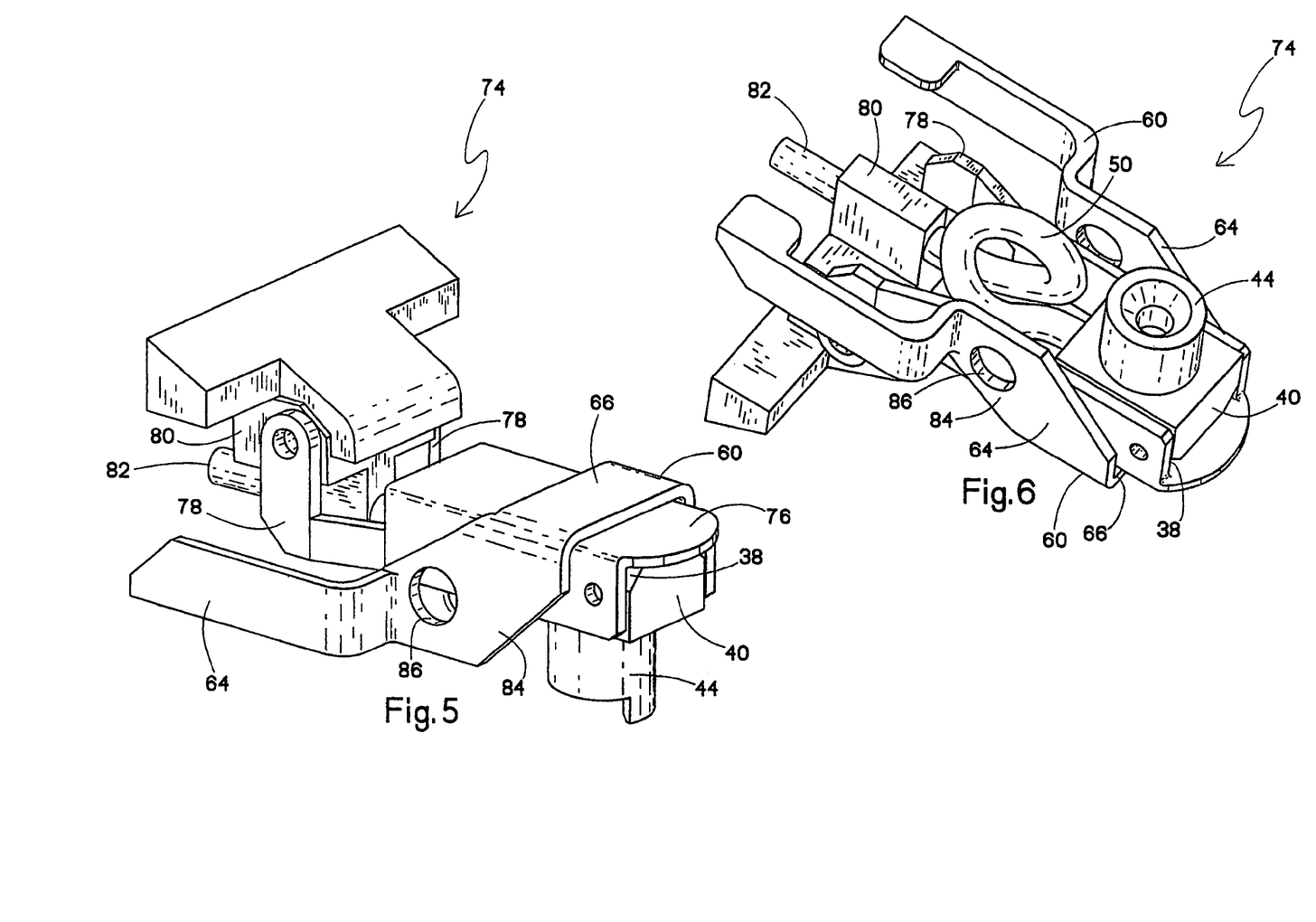
FIG. 5 is a top perspective view of an alternate embodiment of the actuator of FIG. 2.
FIG. 6 is an inverted perspective view of the actuator of FIG. 5.

Referring now to FIGS. 5 and 6, an alternate embodiment of the actuator 34 is generally designated 74. Shared components with the actuator 34 are designated with like reference numbers. The main distinction between the actuators 34 and 74 is that the actuator 74 is intended for use in a retrofit situation in tools where the cylinder head lacks the ears 59. Instead, the actuator element 76 is provided with a pair of angled brackets 78 which pivotally engage an adapter 80 having a stem 82 insertable into the aperture 55 in the cylinder head 52. The fuel conduit 50 is inserted into the adapter 80 using a barbed fitting 56 (FIG. 3) or other suitable conduit fastener. Another difference between the actuator 74 and the actuator 34 is that sidewalls 84 of the pivot member 60 are provided with pivot apertures 86 instead of the lugs 68. Pivotal engagement of the pivot member 60 with the fuel cell door 18 is by lugs (not shown) on the door. Operation of the actuator 74 is otherwise the same as the actuator 34. It will be appreciated that the actuator 74 may be provided as a kit to users of existing tools, such kits including the actuator element 76, the stem receiver 40, a fuel conduit 50, and if required, the adapter 80 and the pivot member 60.

Figure 7:
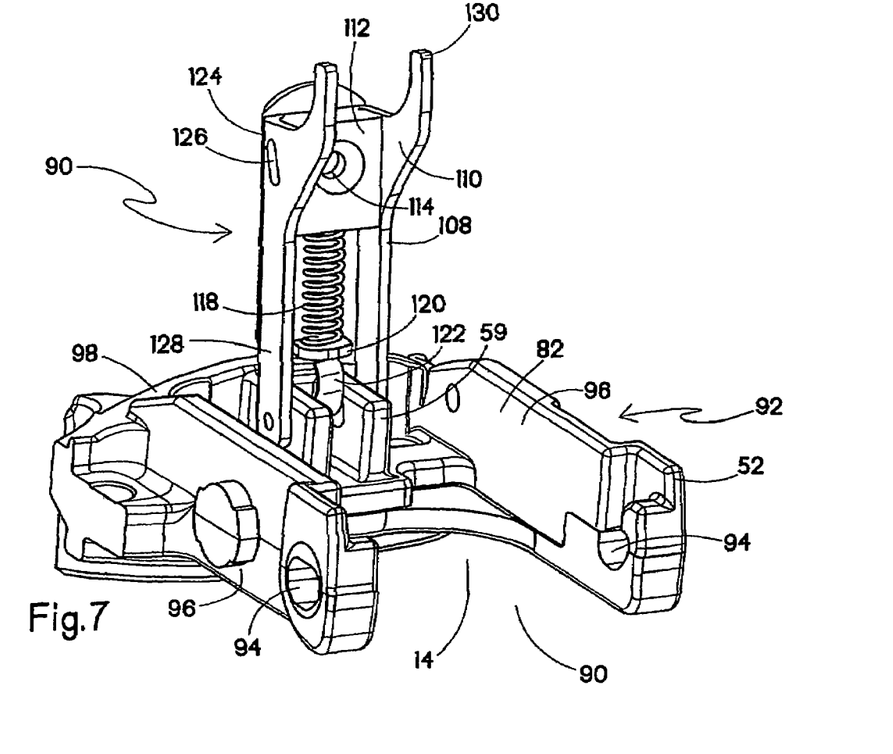
FIG. 7 is a fragmentary perspective view of a second alternate embodiment of the present fuel cell actuator for a combustion tool shown in an open position.
Figure 8:
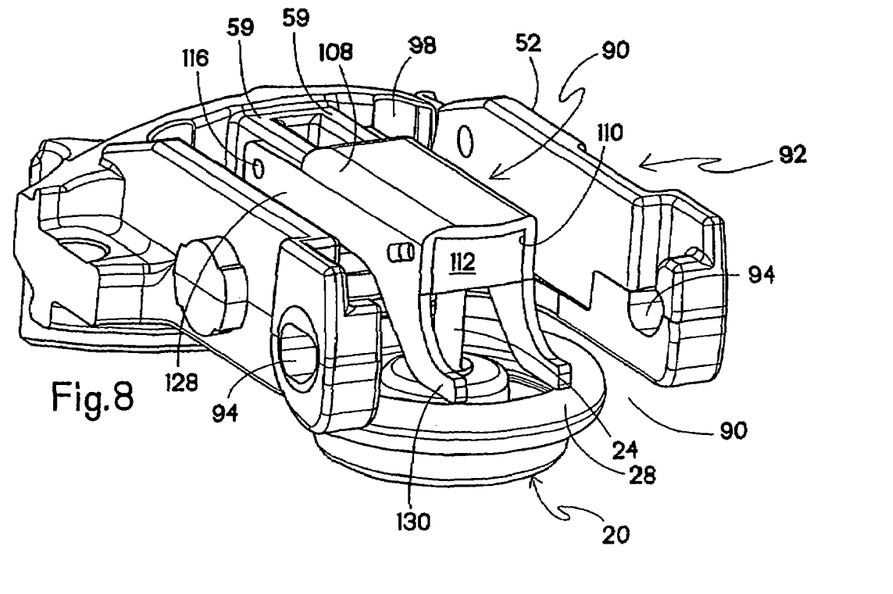
FIG. 8 is a fragmentary perspective view of the fuel cell valve actuator of FIG. 7 shown in the closed position.

Referring now to FIGS. 7 and 8, another embodiment of the present actuator is generally designated 90, and shared components are designated with corresponding reference numbers. The present actuator is intended for use in a tool 92, similar to the tool 10 but having a pivot element (not shown) pivotally engaged in throughbores 94 in each of a pair of bracket arms 96 of the cylinder head 52 which in part define the fuel cell chamber 14 and follows a range of movement between an open position, in which the conventional fuel cell is cleared for insertion or withdrawal from the tool 92, and a closed position which is required for combustion and further operation of the tool. In the closed position, among other things, the fuel cell is pushed toward a bracket base 98. Since conventional fuel cells require supplemental or external fuel metering valves, such valves are constructed to dispense a metered portion of fuel upon the actuator being activated by a linkage controlled by the workpiece contact element.

Figure 13:
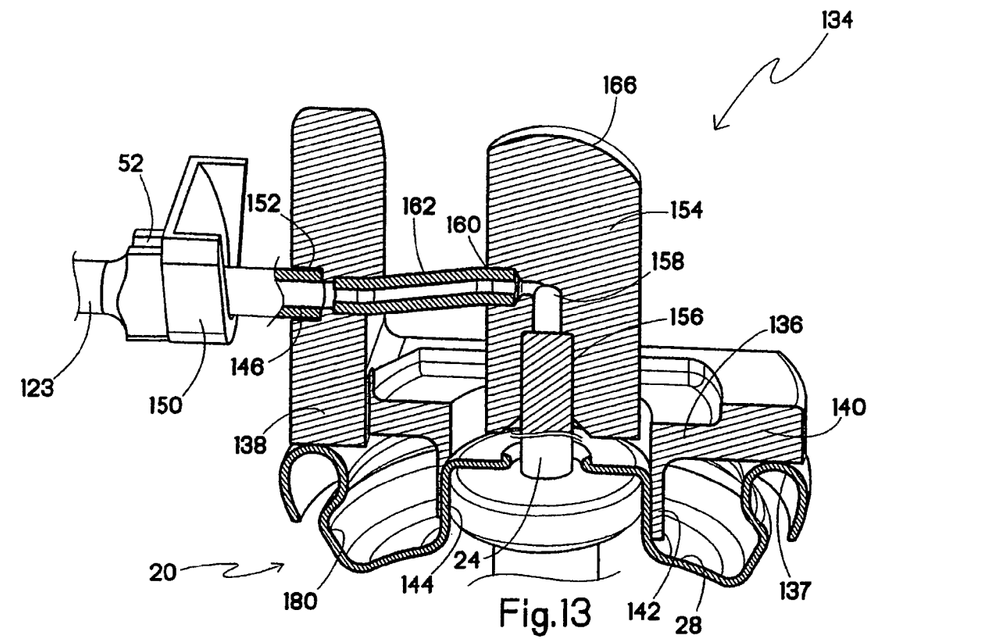
FIG. 13 is a fragmentary, vertical cross-section of a third alternate embodiment of a fuel cell valve actuator for use with a combustion tool.

In the present tool 92, the present slider actuator 90 is provided for releasing the fuel stored in the internal fuel cell metering valve 22 (FIG. 3). The actuator 90 complements a forward motion of the fuel cell 20 and, during such motion, axially depresses the valve stem 24 sufficiently to dispense the measured dose of fuel. Included in the actuator 90 is an actuator element, also referred to as a slider housing 108 pivotally engaged on the cylinder head portion 82 and defining a generally "U"-shaped channel 110 similar to the channel 38. The actuator 90 pivots relative to the ears 59 between an open position shown in FIG. 7, and a closed position shown in FIG. 8. A stem receiver or slider block 112 having a stem receptacle 114 is slidably engaged in the channel 110 and is biased away from a pivot axis defined by a pin 116 by a biasing element 118, preferably a spring; however other such biasing elements known to skilled practitioners are contemplated. A stop 120 (FIG. 7) is located in operational relationship to the channel 110 to compress the biasing element 118 against the slider block 112. It is preferred that the stem receptacle 114 is tapered to better locate the valve stem 24 and align a passageway 32 with a fuel conduit 122, which creates a fluid communication between the slider block 112 and an internal tool fuel line 123 (FIG. 13). While other arrangements are contemplated, such as externally of the channel 110, it is preferred that the fuel conduit 122 is located within the channel, and also passes though the biasing element 118.

Figure 9:
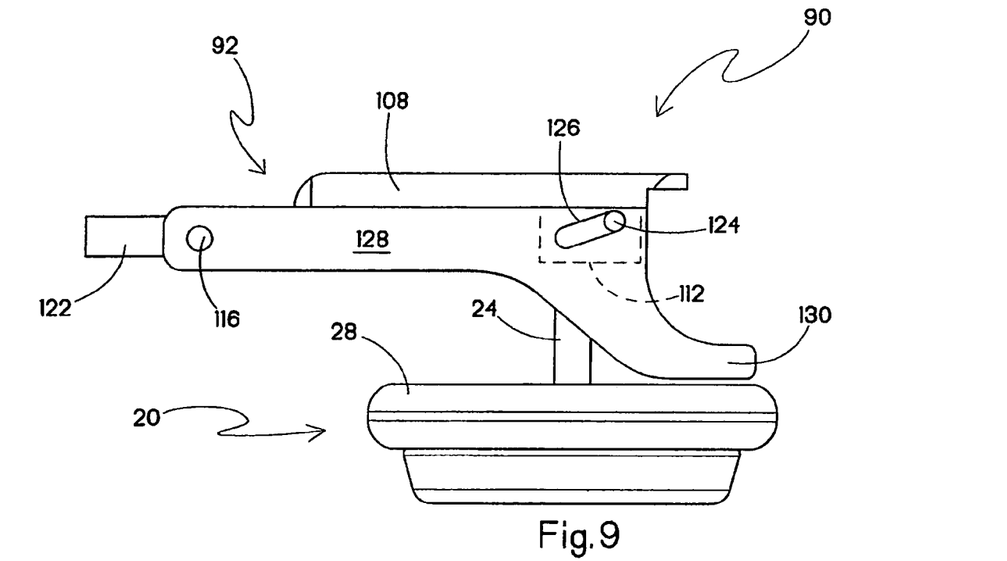
FIG. 9 is a fragmentary side elevation of the fuel cell valve actuator of FIG. 7 shown in a closed, pre-engaged position.
Figure 10:
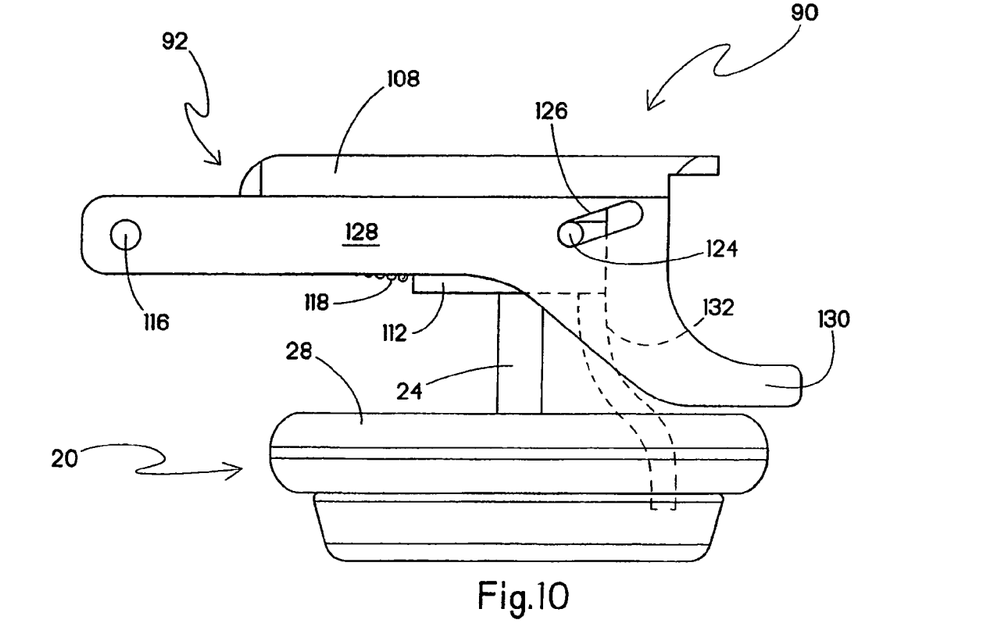
FIG. 10 is a fragmentary side elevation of the fuel cell valve actuator of FIG. 9 shown in the closed, engaged position.

Referring now to FIGS. 7, 9 and 10, it will be seen that the slider block 112 has at least one and preferably two laterally extending axle pins 124 each slidably engaged in a corresponding angled slot 126 in sidewalls 128 of the slider housing 108. The angular orientation of the slots 126 provides a lateral and a vertical component of movement to the slider block 112 such that as the slider block moves in the channel 110 from a disengaged or rest position (best seen in FIGS. 8 and 9) toward the pivot axis 116, the block also moves slightly transverse to a longitudinal axis of the channel.

This latter movement component, resulting in an engaged or fuel dispensing position (best seen in FIG. 10) causes the depression of the valve stem 24, which is engaged in the stem receptacle 114 and results in the release of the stored fuel into the communication tube 122 and ultimately into the cylinder head 52. As is known in the art, the cylinder head 52 partially defines the combustion chamber into which fuel is injected, mixed with air and ultimately ignited for causing the forceful movement of a driver blade and the resulting driving of a fastener. Upon completion of the combustion portion of the tool operational cycle, the workpiece contact element extends relative to the tool housing 12 and the forward force on the fuel cell 20 is released, causing the biasing element 118 to push the slider block 110 to the rest position in FIG. 9. It will also be seen that the slider housing 108 may be provided with at least one and preferably two slider legs 130 constructed and arranged to slidably engage the tool 10 for keeping the housing 108 from pushing away from the fuel cell 20. The legs 130 are provided to make sure all of the vertical movement of the slider block 110 is used to fully depress the stem of the fuel cell. Further stress relief for the stem of the fuel cell may be provided by a slider block leg 132 (shown in phantom).

Figures 11, 12:
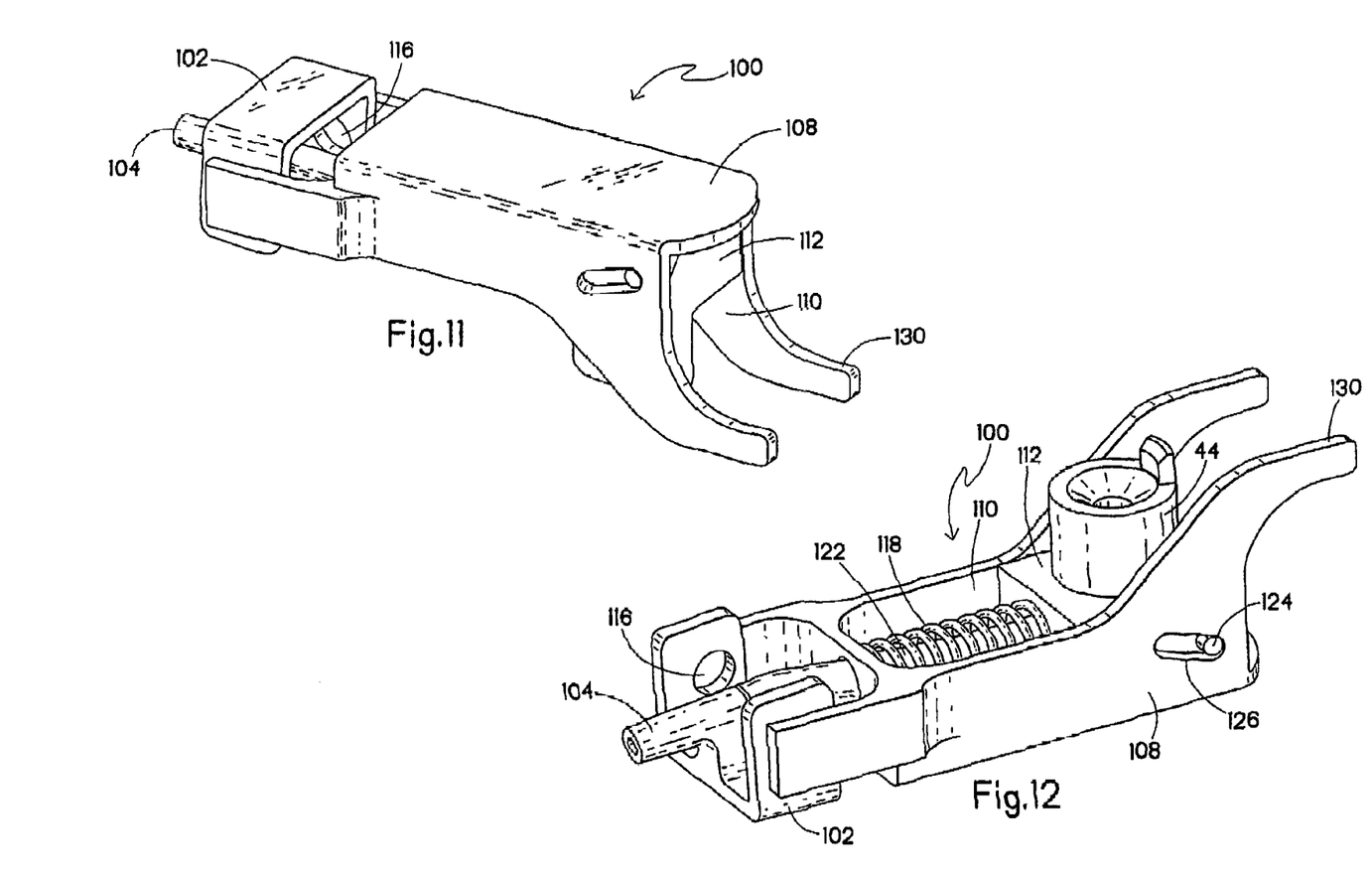
FIG. 11 is a top perspective view of an alternate embodiment of the actuator shown in FIGS. 7-10.
FIG. 12 is an inverted perspective view of the actuator of FIG. 11.

Referring now to FIGS. 11 and 12, an alternate embodiment of the actuator 90 is generally designated 100, and shared components are designated by corresponding reference numbers. As is the case with the actuator 74, the actuator 100 is intended for use in a retrofit situation, where the cylinder head 52 lacks the ears 59. The pivot axis 116 is engaged on an adapter 102 having a stem 104 projecting into the cylinder head 52 at the aperture 55 similar to the adapter 80. The stem 104 engages the fuel conduit 122 using barb fittings (not shown) or the like as described above. Fluid fuel communication is thus established between the conduit 122, through the adapter 102 and into the cylinder head 52.

Referring now to FIG. 13, an alternative embodiment of the actuator 106 is generally designated 134, and as was the case with the actuator 106, has the primary function of exerting at least one of an axial and a transverse force on the main fuel cell valve stem 24 for dispensing a metered dose of fuel to the cylinder head 52. The actuator 134 is contemplated as being alternatively provided as a part of the tool 92 or with the fuel cell 20. A base component 136 engages the closure 28 at at least one location for supporting the valve stem 24. In the depicted embodiment, the base component 136 engages a peripheral edge or rim 137 at two ends 138, 140, as well as having a generally centrally located socket 142 for receiving a cap portion 144 of the closure 28.

The first end 138 projects generally normally (or vertically as the unit is depicted in FIG. 13) to the base component 136 and also includes a fuel line communicator tube 146 for connection to the fuel line 123 passing though the cylinder head portion 52 (fragmentarily shown here), which in this embodiment includes a locating "V"-shaped casting 150. The tube 146 is insertable into the casting 150 to sealingly engage the fuel line 104. Alternately, the tube 146, which may be rigid or flexible, and may be a segment of the fuel line 104 extending though the V-shaped casting 150 and being insertable into the first end 138. Whichever alternative is selected, appropriate steps should be taken to effect sealing of the fuel passageway, as by a tight friction fit of the tube 146 into a bore 152 in the first end 138.

Also included in the actuator 134 is a stem receiving portion 154 provided with a stem bore 156 for snugly receiving the valve stem 24, an internal fuel passage 158 and a bore 160 for accommodating a connector tube 162. The connector tube 162, which is preferably flexible, and may be integral with the actuator 134 or a separate piece, provides fluid communication between the fuel passage 158 and the first end 138. The stem bore 156, in communication with the bore 142, receives the valve stem 24. Also, the stem receiving portion 154 moves with the main valve stem 24 as it reciprocates between the open and closed positions. This movement is relative to the base component 136. In the preferred embodiment, especially when the actuator 134 is provided with the fuel cell 20, the first end 138 is taller than the stem-receiving portion 154 to prevent accidental depression of the portion 154 or of the valve stem 24 during storage, shipping or installation. An upper portion 166 of the stem receiving portion 154 is preferably curved for receiving the workpiece contact element-actuated linkage 100 and exerting a generally axial, or a combination of axial and transverse forces on the valve stem 24, depending on the application. However, other shapes are contemplated for the portion 166 which perform this function.

Figure 14:
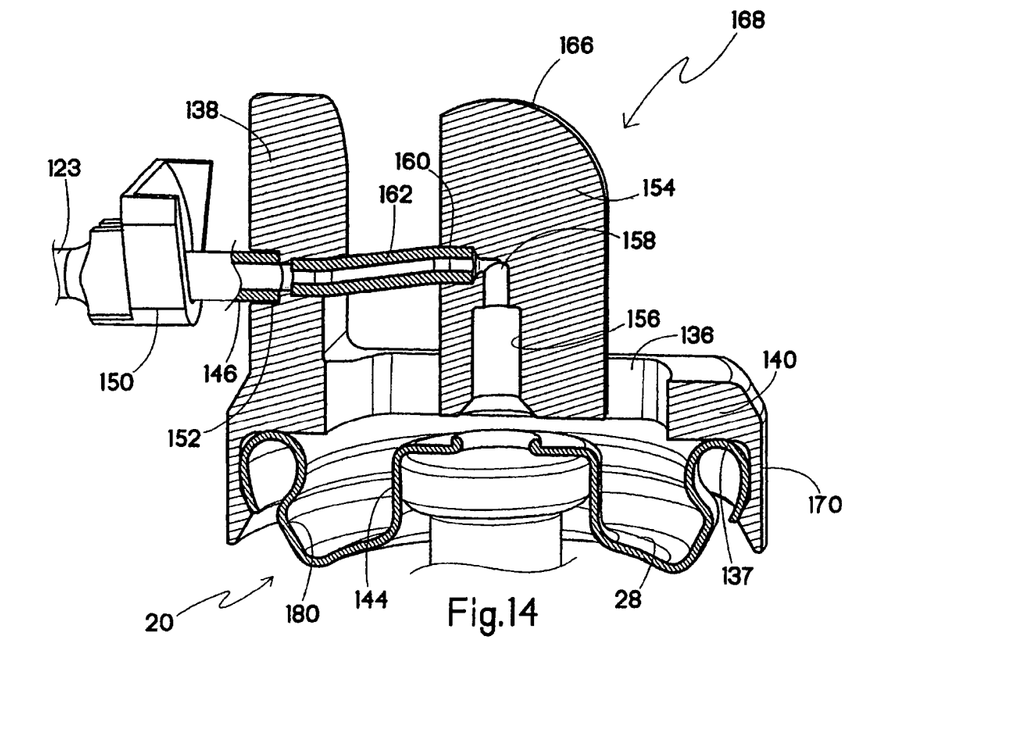
FIG. 14 is a fragmentary vertical cross-section of a fourth alternate embodiment of the present fuel cell valve actuator.

Referring now to FIG. 14, an alternate embodiment of the actuator 134 is generally designated 168. Shared components are designated with identical reference numbers. A main distinction of the actuator 168 is that the base component 136 now includes a depending peripheral skirt 170 with at least one barbed internal gripping formation 172 for securely engaging the peripheral rim 137 of the closure 28. It is preferred that the skirt 170 and the barbed gripping formation are both annular, but it is also contemplated that the skirt, and/or the formation 172 may be provided in circumferentially spaced segments. In the actuator 168, the socket 142 is eliminated. Also, it will be more easily seen in the actuator 168 that the stem receiving bore 156 is flared for easier location and registry of the main valve stem 24.

Figure 15:
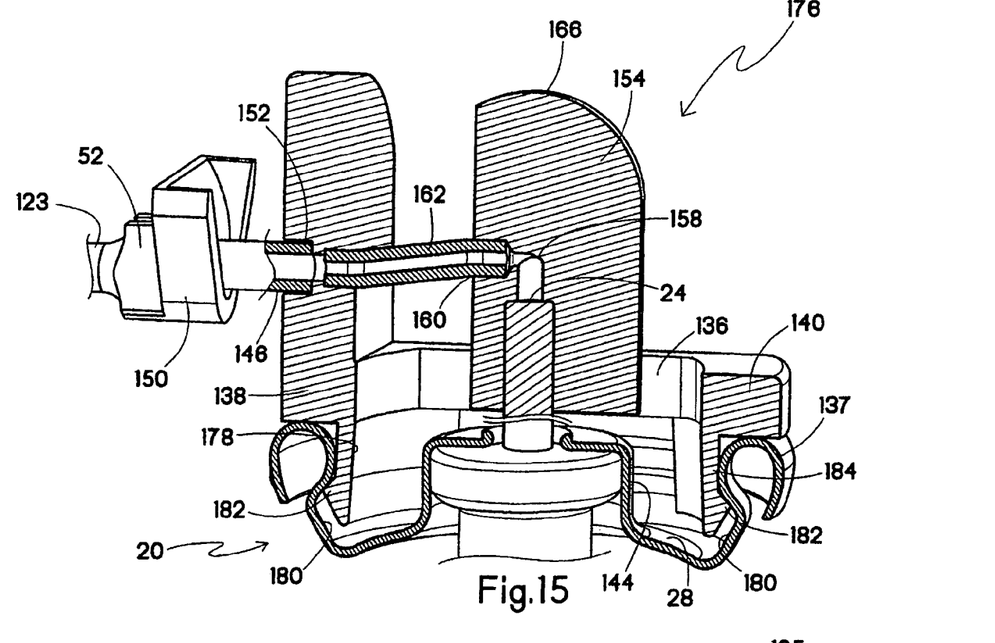
FIG. 15 is a fragmentary vertical cross-section of a fifth alternate embodiment of the present fuel cell valve actuator.

Referring now to FIG. 15, yet another alternate embodiment of the actuators 134, 168 is generally designated 176, and shared components are indicated with identical reference numbers. The actuator 176 differs principally from the actuator 168 in that instead of a depending peripheral clamping skirt, the base 136 is provided with at least one and preferably a plurality of depending clamping legs 178, each of which is arcuate in construction to frictionally engage an inner surface 180 of the peripheral closure rim 137. In addition, to more securely clamp onto the inner surface 180, the legs 178 are preferably provided with outwardly projecting barb formations 182 for engaging an underside of the rim 137 and also for defining a recess 184 for receipt of the tubular-shaped curvature of the rim.

Figure 16:
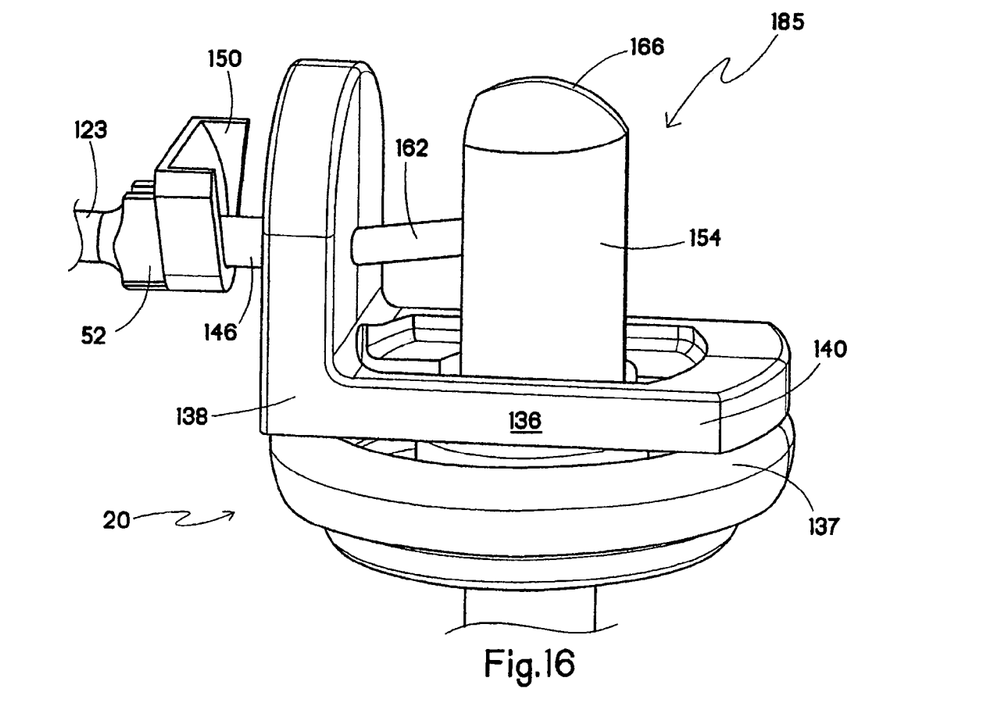
FIG. 16 is a fragmentary side elevation of a sixth alternate embodiment of the present fuel cell valve actuator.

Referring now to FIG. 16, a further alternate embodiment of the actuators 134, 168 and 176 is generally designated 185. The actuator 185 is virtually identical to the actuator 176 with the exception that the depending legs 178 are omitted, and the base 136 thus rests upon the rim 137.

Figure 17:
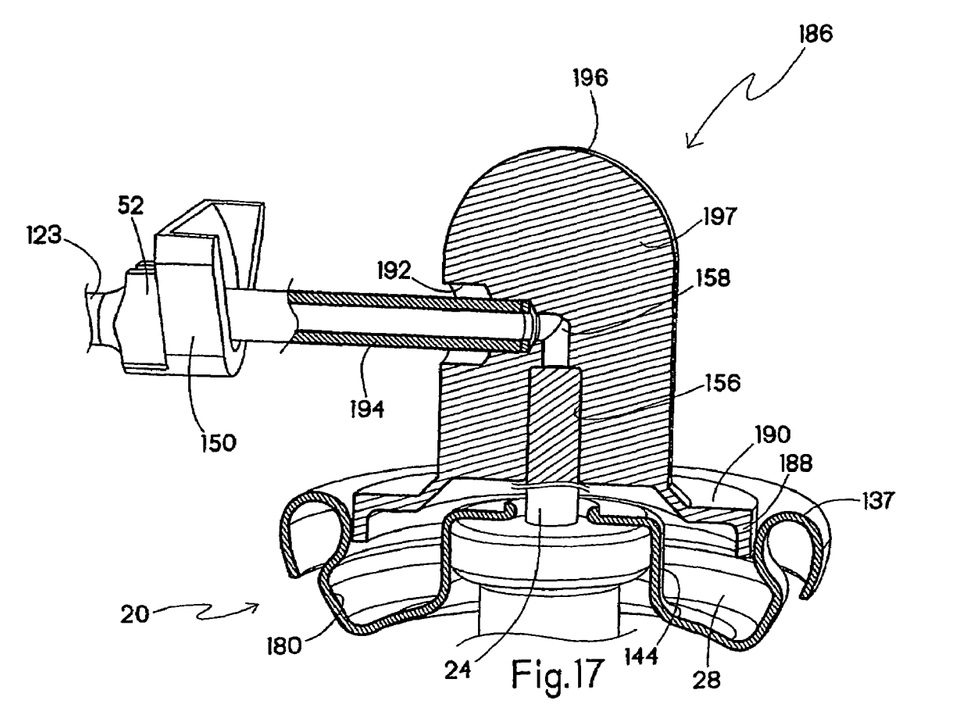
FIG. 17 is a fragmentary vertical cross-section of a seventh alternate embodiment of the present fuel cell valve actuator.

Referring now to FIG. 17, still another alternate embodiment of the actuator 134, 168 and 176 is generally designated 186, with shared components designated with identical reference numbers. The actuator 186 engages the closure 28 in a snug yet slidable relationship between a depending lip 188 and the inner peripheral surface 180 of the rim 137. Depending from a generally planar base 190, the depending lip 188 needs to slide relative to the closure 16 to accommodate the reciprocating movement of the main valve stem 24 relative to the closure.

Another distinguishing feature of the actuator 186 is that is includes a fuel tube bore 192 for receiving an extended flexible fuel tube 194 which is in fluid communication with the main fuel line 104. It will be seen that the fuel tube 194 is longer than the connector tube 162, and one reason for the extra length is the accommodation of the sliding action of the actuator 186. Another distinguishing feature of the actuator 186 is that an upper curved portion 196 is generally hemispherical in shape to receive one or both of axial and transverse forces from the linkage 100. The upper curved portion 196 is part of a stem receiving portion 197, which in this embodiment is unitary with the base 190.

In operation, the various embodiments can be described in relation to three main groups of FIGS. The first relates to the embodiments of FIGS. 1-6. First, the fuel door 18 of the tool 10 is opened, and an in-can fuel metering fuel cell 20 is placed into the fuel cell chamber 14 with the first end 30 of the main valve stem facing out. The actuator 34 is rotated downwardly onto the top of the fuel cell, and the fuel door 18 is closed. Once the tool is actuated, the fuel cell 20 and the fuel door remain stationary, and the rotation of the arms 64 upon the actuators 36, 76 causes the stem of the fuel cell to be depressed.

Referring now to FIGS. 7-12, the operation is similar to that described above up to the closure of the fuel door 18. However, in this embodiment, when the tool 92 is actuated, the fuel door 18 flexes and the fuel cell 20 is pushed toward the cylinder head 52. This forward movement forces the slider block 112 to move down, depressing the stem of the fuel cell 20 and dispensing a measured dose of fuel for combustion.

Referring now to FIGS. 13-17, the fuel door 18 is opened and the fuel cell 20 with the internal fuel metering valve and with the adaptor/actuator 134, 168, 176, 185, and 186 (collectively "134") is inserted into the fuel cell chamber 14. Prior to tool use, the tubing 146 is inserted into the casting 150 so that the stem receiving portions 154, 197 are in fluid communication with the fuel cell and the cylinder head 52. The fuel door 18 is then closed and the tool 92 is ready for combustion. When the tool is actuated, the fuel cell 20 and its actuator 134 are held against the casting 150. Rotation of the levers 64 in the fuel door 18 depresses the upper curved portions 166, 196 and simultaneously depresses the fuel cell stem 24, releasing a metered dose of fuel for combustion.

While particular embodiments of the present actuator for a fuel cell for a combustion tool has been shown and described, it will be appreciated by those skilled in the art that changes and modifications may be made thereto without departing from the invention in its broader aspects and as set forth in the following claims.

The invention claimed is:

1. An actuator for use with a combustion tool fuel cell having an internal metering valve, a valve stem and a closure with a peripheral rim, comprising:
   a base portion with a depending lip configured for slidingly engaging the peripheral rim;
   a stem receiving portion unitary with said base portion, having a bore for receiving the valve stem and an upper end being curved for receiving forces from a tool linkage and exerting at least one of an axial and a transverse force on the valve stem, said stem receiving portion also supporting a fuel tube in fluid communication with said valve stem and being in fluid communication with a combustion tool fuel line such that fuel from the fuel cell is transmitted into the fuel line.

2. In a combustion-powered fastener driving tool employing a fuel cell having an internal fuel metering valve with an axially reciprocating delivery stem, an actuator for causing the dispensing of a desired dose of fuel from the fuel cell prior to each combustion event, said actuator comprising:
   at least one actuator element configured for exerting an axial force on the stem, releasing the dose of fuel, said actuator including a pivot member configured for receiving a force in a first axial direction, and associated with said actuator element for generating said axial force on the stem in an opposite axial direction; and
   a fuel conduit associated with said element and being in fluid communication with the stem for transmitting the fuel for delivery to a combustion engine.

3. The tool of claim 2 further including a linkage member movable by activation of a workpiece contact element, wherein said pivot member is movable between a rest position wherein the fuel cell metering valve is closed, and an actuation position, and movement to said actuation position is effected by generally axial movement of said linkage member acting on said pivot member.

4. The tool of claim 3 wherein said pivot member is held in said rest position by a force exerted by the internal fuel metering valve stem.

5. The tool of claim 2 further including a fuel cell door, wherein said pivot member is associated with said door.

6. In a combustion-powered fastener driving tool employing a fuel cell having an internal fuel metering valve with an axially reciprocating delivery stem, an actuator for causing the dispensing of a desired dose of fuel from the fuel cell prior to each combustion event, said actuator comprising:
   at least one actuator element configured for exerting an axial force on the stem, releasing the dose of fuel, wherein said actuator element is provided with a stem receiver configured for receiving the fuel cell stem at a first end, pivotally engages a cylinder head of the tool at a second end and places the fuel cell in fluid communication with said cylinder head; and
   a fuel conduit associated with said element and being in fluid communication with the stem for transmitting the fuel for delivery to a combustion engine.

7. In a combustion-powered fastener driving tool employing a fuel cell having an internal fuel metering valve with an axially reciprocating delivery stem, an actuator for causing the dispensing of a desired dose of fuel from the fuel cell prior to each combustion event, said actuator comprising:
   at least one actuator element configured for exerting an axial force on the stem, releasing the dose of fuel, wherein said actuator element is pivotally engaged relative to a cylinder head of the tool; and
   a fuel conduit associated with said element and being in fluid communication with the stem for transmitting the fuel for delivery to a combustion engine.

8. The tool of claim 7 further including an adapter configured for engaging said cylinder head, for pivotally receiving said element and for placing the fuel cell in fluid communication with said cylinder head though said conduit.

9. An actuator assembly for use with a combustion-powered fastener driving tool having a fuel cell compartment with a door and configured for receiving a fuel cell with an internal metering valve and an axially projecting stem so that axial depression of the stem causes the delivery of a measured dose of fuel to the tool for generating a combustion event, said assembly comprising:
   an actuator element being pivotally engageable relative to a cylinder head of the tool;
   a stem receiver engaged on said actuator element and configured for being in fluid communication with the fuel cell stem; and
   a conduit associated with said actuator element for placing said stem receiver in fluid communication with the cylinder head.

10. The actuator assembly of claim 9 further including at least one of a cylinder head adapter for placing said conduit in fluid communication with the cylinder head and a pivot member pivotally engageable on the tool for exerting an axial force on said actuator element.

11. A combustion tool for use with a fuel cell having an internal fuel metering valve emitting a prescribed volume of fuel from a fuel metering chamber though a valve stem, said tool comprising:
   a fuel cell chamber configured for receiving the fuel cell;
   a fuel conduit in fluid communication with said fuel cell chamber; and
   an actuator in operational relationship to said fuel cell chamber, being directly engaged with the fuel cell stem and configured for actuating the fuel metering valve, said actuator including a base component configured for engagement upon the fuel cell, and a stem receiving portion engaged on said fuel cell stem and in fluid communication therewith, said stem receiving portion being movable relative to said base component and connected thereto by a connector tube, such that fluid communication is established between said fuel cell stem and said fuel conduit connected to said base component, and upon periodic movement of said stem receiving portion relative to said base component, fuel flows from said fuel cell stem to the fuel conduit.

12. The combustion tool of claim 11 wherein said actuator is disposed between the fuel cell and said fuel conduit, and is in fluid communication with said fuel conduit.

13. A combustion tool for use with a fuel cell having an internal fuel metering valve emitting a prescribed volume of fuel from a fuel metering chamber though a valve stem, said tool comprising:
   a linkage causing an internal tool actuator force prior to a combustion event;
   a fuel cell chamber configured for receiving the fuel cell;
   a fuel conduit in fluid communication with said fuel cell chamber; and
   an actuator disposed between the fuel cell and said fuel conduit, and is in fluid communication with said fuel conduit, said actuator being in operational relationship to said fuel cell chamber, being directly engaged with the fuel cell stem and configured for actuating the fuel metering valve, wherein, upon exposure to said actuator force by said linkage, said actuator exerts at least one of a transverse force and an axial force on the fuel cell stem for periodically dispensing a metered dose of fuel.

14. The combustion tool of claim 13, wherein said actuator includes a movable stem receiver configured for receiving the fuel cell stem, and as said stem receiver slides transversely of the fuel cell, said stem receiver is configured for exerting said force on the stem, and receives and dispenses a metered amount of fuel from the cell.

15. The combustion tool of claim 14, wherein said stem receiver is biased to a rest position and a tool linkage is connected to said actuator for overcoming said bias and for moving said stem receiver to a fuel dispensing position, which causes said depression of the valve stem.

16. The combustion tool of claim 15, wherein said actuator is configured for directly receiving the valve stem, providing fluid communication with the outlet and the fuel conduit, and for being activated by said tool linkage.

17. The combustion tool of claim 16, wherein said fuel cell includes a closure, and said actuator is configured for securely engaging the closure.

18. The combustion tool of claim 16, wherein said actuator has a curved surface for engagement by the tool linkage.

19. A fuel cell actuator for use in a combustion tool employing a fuel cell having an internal fuel metering valve emitting a prescribed volume of fuel from a fuel metering chamber, the tool including a fuel cell chamber configured for receiving the fuel cell, a fuel conduit in fluid communication with the fuel cell chamber, said actuator comprising:
  an actuator element pivotally connectable relative to said fuel cell chamber and defining a channel;
  a stem receiver slidably disposed in said channel between a rest position and a fluid dispensing position, said stem receiver including a stem receptacle for receiving a fuel cell valve stem; and
  a biasing element for biasing said stem receiver in said rest position; and
  a cylinder head adapter configured for pivotally engaging said actuator element and placing said stem receiver in fluid communication with a cylinder head of the tool.

20. An actuator for use with a combustion tool fuel cell having an internal metering valve and a valve stem, comprising:
  a base portion configured for engaging a closure of the fuel cell; and
  a stem receiving portion configured for receiving the valve stem and moving relative to said base portion;
  said stem receiving portion engaging a connector tube being in fluid communication with a combustion tool fuel line via a connection located at and supported by said base portion, such that actuation of said stem receiving portion causes a metered dose of fuel to be dispensed into said connector tube and ultimately into the fuel line;
  wherein said stem receiving portion has a surface configured for receiving a force from a tool actuator linkage and responsively exerting at least one of an axial and a transverse force on the main valve stem.

21. An actuator for use with a combustion tool fuel cell having an internal metering valve and a valve stem, comprising:
  a base portion including a formation configured for frictionally engaging a closure of the fuel cell; and
  a stem receiving portion configured for receiving the valve stem and moving relative to said base portion;
  said stem receiving portion being connected to a connector tube in fluid communication a tool fuel line supported by said base portion, such that actuation of said stem receiving portion causes a metered dose of fuel to be dispensed into said connector tube and ultimately into the fuel line.

22. An actuator for use with a combustion tool fuel cell having an internal metering valve and a valve stem, comprising:
  a base portion configured for engaging a closure of the fuel cell; and
  a stem receiving portion configured for receiving the valve stem and moving relative to said base portion;
  said stem receiving portion engaging a connector tube being in fluid communication with a combustion tool fuel line via a connection at said base portion;
  wherein said base portion is configured for supporting said connection and has an end which is taller than said stem receiving portion, such that actuation of said stem receiving portion causes a metered dose of fuel to be dispensed into said connector tube and ultimately into the fuel line.

* * * * *

UNITED STATES PATENT AND TRADEMARK OFFICE
CERTIFICATE OF CORRECTION

PATENT NO. : 7,591,249 B2  Page 1 of 1
APPLICATION NO. : 11/242311
DATED : September 22, 2009
INVENTOR(S) : Wagdy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 241 days.

Signed and Sealed this

Twenty-first Day of September, 2010

David J. Kappos
*Director of the United States Patent and Trademark Office*